April 18, 1972 — M. R. ROYCE — 3,657,138
VISIBLE-EMITTING CERIUM-ACTIVATED CALCIUM ALUMINUM OXIDE PHOSPHOR
Filed Jan. 22, 1970

DECAY TIME AFTER REMOVAL OF EXCITATION
* PHOSPHOR BRIGHTNESS NORMALIZED AT 100% TO A JEDEC P1 PHOSPHOR

INVENTOR.
MARTIN R. ROYCE
BY
Attorney

United States Patent Office 3,657,138
Patented Apr. 18, 1972

3,657,138
VISIBLE-EMITTING CERIUM-ACTIVATED CALCIUM ALUMINUM OXIDE PHOSPHOR
Martin Robert Royce, Lancaster, Pa., assignor to RCA Corporation, New York, N.Y.
Filed Jan. 22, 1970, Ser. No. 4,826
Int. Cl. C09k 1/18
U.S. Cl. 252—301.4 R  3 Claims

ABSTRACT OF THE DISCLOSURE

A phosphor consisting essentially of calcium aluminum oxide activated solely by cerium. The phosphor may be described by the molecular formula $Ca_3Al_2O_6:xCe$, wherein $x$ is in the range of 0.0005 to 0.1 mole. The disclosure includes a cathode-ray tube having a viewing-screen structure comprised of the new phosphor.

BACKGROUND OF THE INVENTION

This invention relates to a new luminescent material or phosphor which, when excited by cathode rays, emits visible radiation at about 5600 to 5700 A.U. (angstrom units). The invention includes a cathode-ray tube having a luminescent viewing-screen structure comprised of the new phosphor.

Cerium-activated phosphors are known in the phosphor art. For example, U.S. Pat. No. 2,590,411 to S. Isenberg discloses a photoluminescent cerium-activated calcium aluminate having the molecular formula $$CaAl_2O_4 \cdot 3Al_2O_3:Ce$$

which emits ultraviolet light (2850 to 3300 A.) when excited with shorter wavelength ultraviolet light (2537 A.). U.S. Pat. No. 2,569,939 to D. W. Lyon discloses a cerium-and-samarium-activated calcium aluminum oxide storage phosphor having the molecular formula $$3CaO \cdot Al_2O_3:Ce:Sm$$

which emits orange light when excited with ultraviolet light (1850 A.). Cerium-activated yttrogarnet disclosed in Applied Physics Letters 11, 53 (1967) emits visible light upon excitation with cathode rays.

SUMMARY OF THE INVENTION

The new visible-emitting phosphor consists essentially of calcium aluminum oxide activated solely by cerium, and may be described by the molecular formula $$Ca_3Al_2O_6:xCe$$

wherein $x$ is in the range of 0.0005 to 0.1 mole.

The new phosphor has a different chemical composition from prior cerium-activated phosphors. It emits visible radiation which peaks spectrally at approximately 5600 to 5700 A.U. when excited by cathode rays. This is surprising since cerium in prior calcium aluminate phosphors produced either an ultraviolet emission or a storage property.

The invention includes a novel cathode-ray tube having a viewing-screen structure comprised of the new phosphor which may be, for example, a flying-spot scanner, oscilloscope, or multi-color kinescope.

DESCRIPTION OF PREFERRED EMBODIMENT

Figure 1:
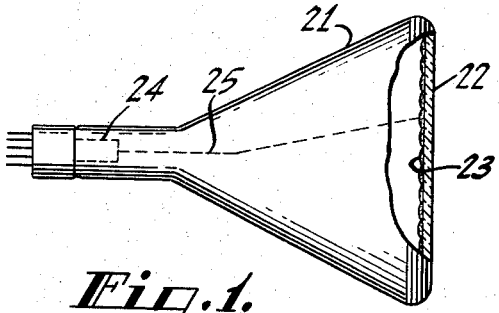
FIG. 1 is a broken-away side view of an improved cathode-ray tube which includes a viewing-screen structure comprising the phosphor of this invention.

The tube illustrated in FIG. 1 comprises a glass envelope 21 having a faceplate 22. On the inner surface of the faceplate 22 is a viewing screen 23 comprising the phosphor of the invention. At the opposite end of the tube is an electron gun 24 which projects an electron beam 25 to strike the screen 23. The luminescence of the phosphor can be conducted through the faceplate 22 as in the flying-spot scanner or oscilloscope, or can be conducted backward towards the electron gun 24, as in a sensing-type kinescope.

The new phosphor may be described by the molecular formula $Ca_3Al_2O_6:xCe$ and consists essentially of calcium aluminum oxide with cerium included as the sole activator. One embodiment of the new phosphor may be prepared by a preferred procedure given in the example below.

EXAMPLE

Dry mix for approximately 5 minutes a quantity of materials of the following proportions:

|   | Grams |
|---|---|
| Calcium oxide CaO | 168.24 |
| Aluminum oxide $Al_2O_3$ | 101.96 |
| Cerium dioxide $CeO_2$ | .86 |

Heat the mixture of materials at approximately 1200° C. for 1 hour. The cooled reaction product is a phosphor of the invention which has approximately the molecular formula $Ca_3Al_2O_6:0.02Ce$.

Figure 2:
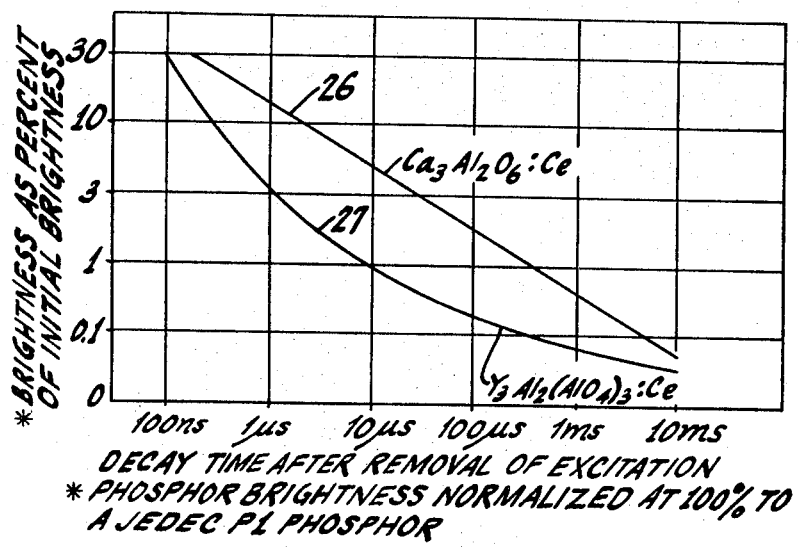
FIG. 2 is a graph including curves illustrating a portion of the luminescence decay of the phosphor of the invention and a prior-art phosphor.

Part of the decay characteristics of a sample of the new phosphor of the example is illustrated by the curve 26 of FIG. 2. A similar curve 27 is shown for a cerium-activated yttrogarnet described by the formula $$Y_3Al_2(AlO_4)_3:Ce$$

for purpose of comparison. The curves were obtained by measuring the luminescence emission decay from a sample of each phosphor after being excited by cathode rays. The curves describe the luminescence decay after the emission was decayed to 30% or less of its initial brightness. The curves shown in FIG. 2 all originate at zero time (not shown) and are normalized at 100% brightness to a JEDEC designated phosphor P1 such as, for example, zinc orthosilicate which is used as a brightness standard. The new phosphor exhibits similar decay characteristics to this prior-art phosphor, and may be used in similar applications. Since calcium is cheaper and more readily available, it promises to be cheaper and more economical for use in cathode-ray tubes.

The new phosphor uses a host material that is essentially $Ca_3Al_2O_6$ or $3CaO \cdot Al_2O_3$. While the molecular ratio of calcium to aluminum may be altered to some extent, any substantial change produces phosphors with degraded performance. The new phosphor uses cerium as the sole activator. Useful visible-emitting properties are obtained where the cerium is 0.0005 to 0.5 mole cerium per mole of the host material. The preferred range is about 0.005 to 0.10 mole cerium per mole calcium aluminum oxide.

I claim:
1. A visible-emitting luminescent material consisting essentially of calcium aluminum oxide activated solely by cerium, wherein the molecular ratio of calcium to aluminum is about 3 to 2, and said cerium content is 0.005 to 0.5 mole per mole calcium aluminum oxide.

2. A luminescent material according to claim 1 having the molecular formula $Ca_3Al_2O_6:xCe$ where $x$ is in the range of 0.0005 to 0.5 mole.

3. A luminescent material according to claim 1 having the molecular composition $Ca_3Al_2O_6:0.02Ce$.

References Cited

UNITED STATES PATENTS 2,569,939 10/1951 Lyon _____ 252—301.4 F
2,590,411 3/1952 Isenberg _____ 252—301.4

ROBERT D. EDMONDS, Primary Examiner